June 29, 1937.  O. V. KEAN  2,085,432
PHOTOGRAPHIC APPARATUS
Filed June 11, 1934  2 Sheets-Sheet 1
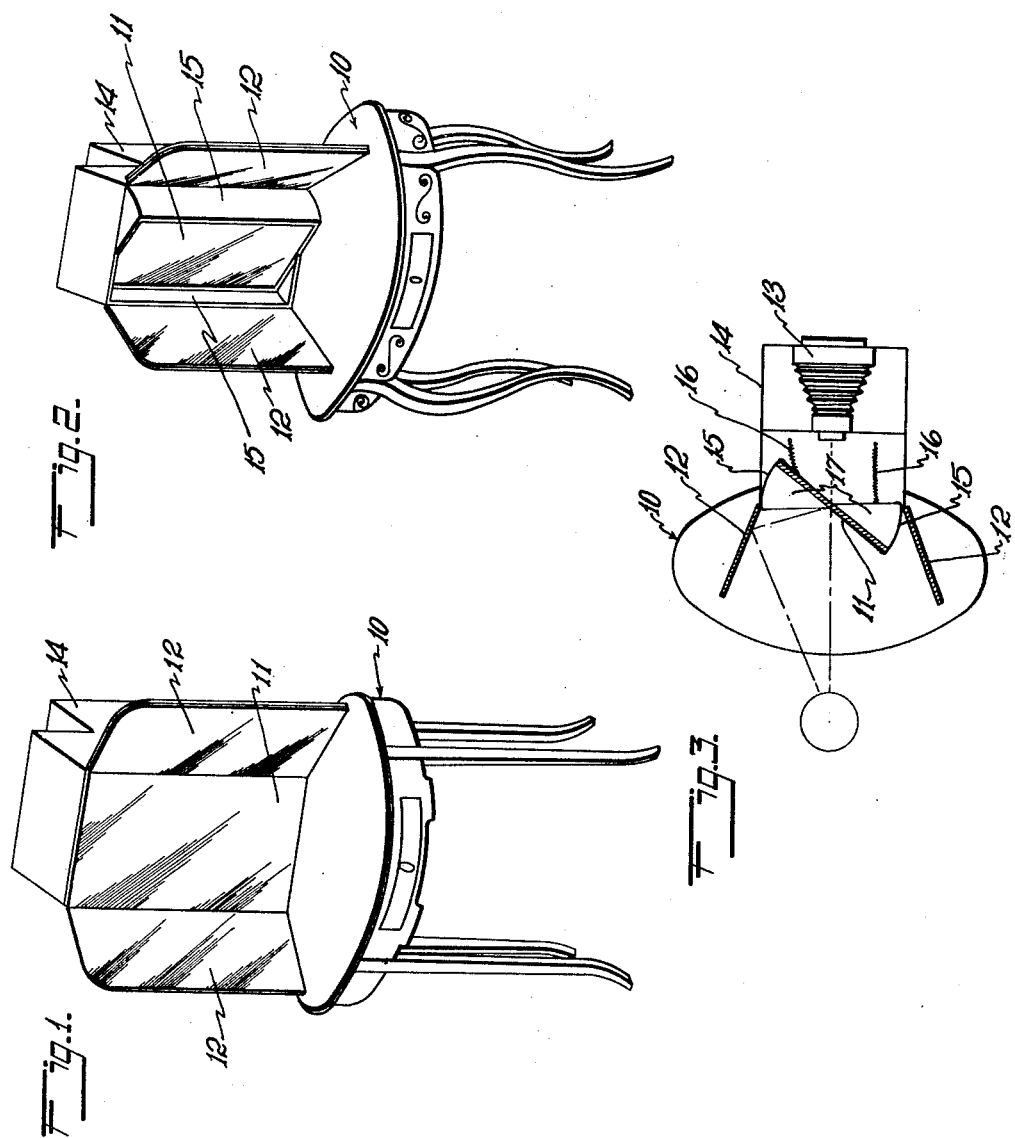
INVENTOR
Otho V. Kean
BY Warfield & Brown
ATTORNEYS

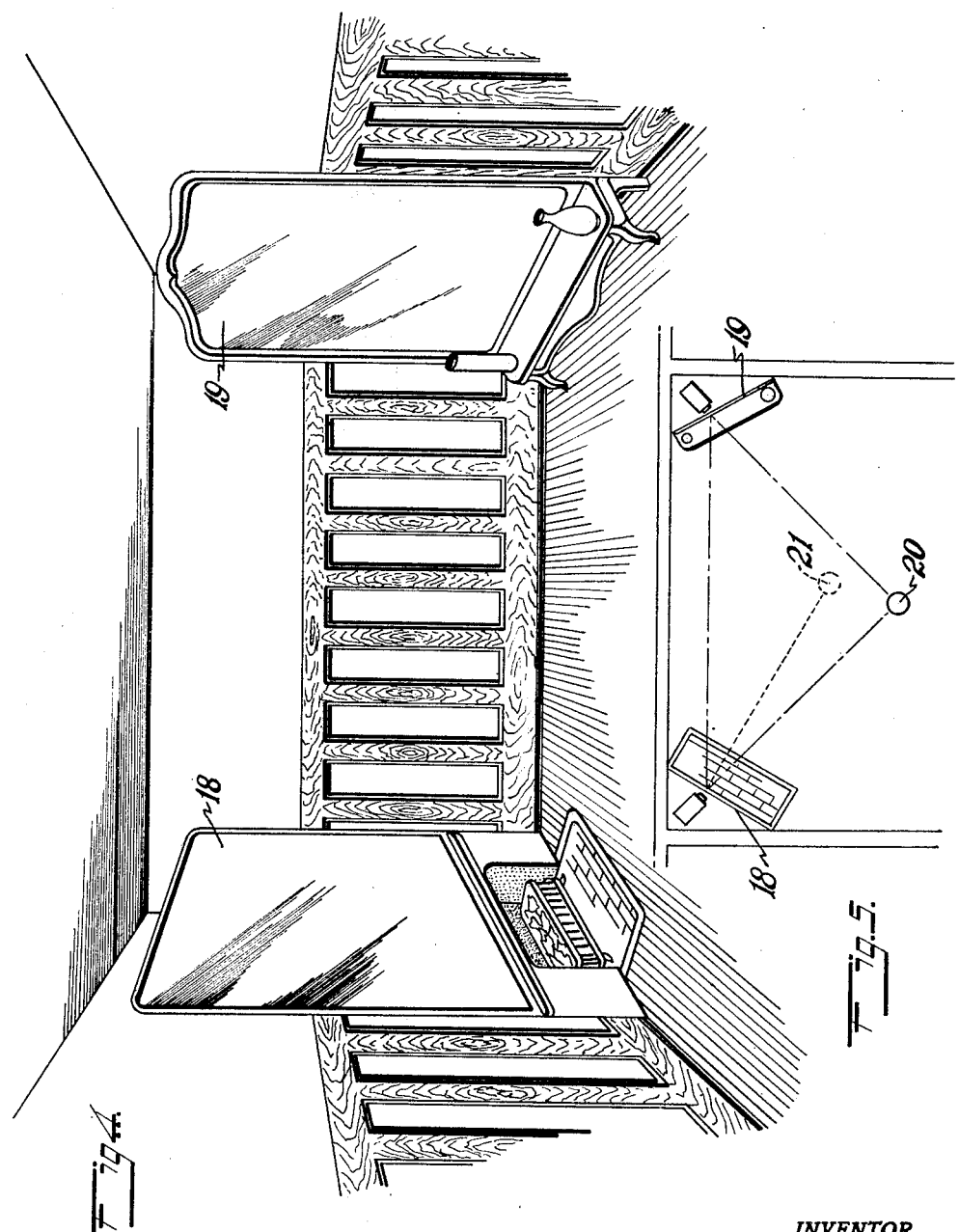

Patented June 29, 1937

2,085,432

UNITED STATES PATENT OFFICE 2,085,432

PHOTOGRAPHIC APPARATUS

Otho V. Kean, Bronxville, N. Y., assignor to Frederic P. Warfield, New York, N. Y.

Application June 11, 1934, Serial No. 729,991

11 Claims. (Cl. 88—74)

This invention relates to an improved photographic apparatus.

In general, it is an object of the invention to provide apparatus of the character described, which will efficiently perform the purpose for which it is intended, which is simple and economical of construction, which can be expeditiously and conveniently manipulated, and which is readily manufactured and assembled.

Another object of the invention is to provide an apparatus whereby a poser composes herself before an ordinary article of furniture of a type which has a mirror associated therewith, the mirror being specially prepared to permit sufficient light to be transmitted so that the poser may be photographed therethrough, and being adapted to reflect an image sufficiently bright that she does not realize that a picture is being taken through the mirror.

Another object is to provide a plurality of such articles of furniture such that not only full-face pictures, but also pictures in profile, may be taken by means of cameras hidden from the poser.

Other objects of the invention will in part be obvious and will in part appear hereinafter.

To these and other ends, the invention comprises certain improvements in construction, combinations of elements, and arrangement of parts, as will be described more fully hereinafter and the application of which will be indicated in the claims.

For a fuller understanding of the nature and objects of the invention reference should be had to the following detailed description taken in connection with the accompanying drawings, in which:

Fig. 1 is a perspective view of an article of furniture embodying one form of the invention;

Fig. 2 is a perspective view of the article shown in Fig. 1 in a different position;

Fig. 3 is a diagrammatic plan view, partially in section, of the article as shown in Fig. 2;

Fig. 4 is a perspective view of a room containing two articles of furniture embodying a modification of the article shown in Fig. 1; and Fig. 5 is a diagrammatic plan view of the room shown in Fig. 4.

It is a well-known psychological fact that a person (particularly a woman) having a picture taken, is apt to be mentally disturbed by the obvious presence of a camera or other heavy photographic impedimenta usually found in a photographic studio. The mind of the sitter is apparently so absorbed with the fear that the impending registration of the features will not be satisfactory that it is impossible to compose the face. For this reason portraits of certain persons always show a strained expression.

Mirrors have been used by photographers for various purposes, but these, as well as the actual camera, have often been connected and operated by heavy mechanical elements, all of which tend to distract the sitter.

The present invention contemplates providing apparatus which is extremely simple, which has almost no moving parts, and which has the appearance of ordinary furniture.

In the embodiment shown in Fig. 1 the only object which the sitter sees is a dressing table or vanity, at which she may seat herself as though she were in her own home. Any article of furniture could be used which normally has a mirror associated with it, so that the sitter may see herself in the mirror and may arrange her posture or features without having the feeling that she is being faced by a machine which will preserve for all time her appearance. The mirror, as described below, is semi-transparent to the extent that a camera placed behind the mirror may take a picture through the mirror, but at the same time not be visible to the sitter. It is intended that the device may be placed in a room having other furnishings to match that particular kind of article through which the picture is being taken. Although the dressing table in Fig. 1 is shown as bare, it may be provided with the usual toilet accessories so as to give in all ways the impression of being merely a part of a dressing room.

In Fig. 1 the numeral 10 denotes a dressing table having a central mirror 11 and side wing mirrors 12 extending from the central mirror. Behind the central mirror and preferably in such a position as not to be seen from the front, is placed a camera 13, which may be enclosed in a casing 14. If it is desired, the table may be placed against what appears to be a wall of the room so that the camera is situated in another room behind the wall. The dressing table or bureau may take the form of a console table and the mirror then appears to be hung on the wall.

The mirror 11 is partially transparent. Such a mirror may be made from an ordinary mirror which reflects all the light incident upon it, or from a mirror having a partially, but sufficiently, reflecting coating, by any convenient method whereby parts of the mirror are rendered more transparent. Portions of the metallic surface may be removed mechanically or they may be removed chemically while the other portions are protected from the chemical agent by a covering, or they may have been protected from the deposit of the reflecting material in the first place. The removed portions may be of any desired configuration such as fine lines or small polygons. Preferably they are not distinguishable from the position of the poser. Any one of the portions is only of sufficient area to transmit a small fraction of the total incident light.

Preferably the mirror is formed from a partially-transparent mirror of the well-known type where the reflecting coating is so thin that it will pass forty or fifty per cent. of the light, as for instance from a sputtered mirror. Portions of the partially-reflecting coating are removed either mechanically or chemically at suitable points or lines, so as to provide a mirror which will pass a considerably larger percentage of the light, as for instance, seventy-five or eighty per cent. Desirably the mirror should reflect not more than thirty per cent. of the light for effective work under ordinary conditions. The removal of the coating may be accomplished by scraping the coating with a needle point or other tool, by the use of a fine tool to scratch through the shellac which protects the silver without scratching the silver and then dipping the mirror in a solution which removes the silver at those points or along those lines where the shellac has been removed and then immersing the mirror in a solution which stops the removing action; or by other suitable means. In such manner there may be produced a mirror which gives a fine clear reflection, but which stops only a small percentage of the light. It may comprise perpendicular sets of parallel lines from which the coating has been removed, which provide complete transmitting portions and intermediate portions carrying a partially-reflecting and partially-transmitting thin coating. In practice, the lines may be made sufficiently fine and sufficiently close together, for example, less than 0.050 inch wide, that they are not obvious to the poser.

When it is desired to take a full-face photograph, the sitter is posed on a chair or settee and sits up at the dressing table. If it is desired, there may be means operated by the foot or hand of the sitter to take the picture at any desired moment.

The article of furniture described above may be used for taking profiles or semi-profiles. The side mirrors 12 may be hinged as they usually are on dressing tables. The central mirror 11 may be rotatable about a vertical axis, whereby it may assume such a position in relation to either of the side mirrors that the sitter, by looking into a side mirror, sees the profile reflected from the central mirror. This profile may then be photographed through the central mirror.

If desired, certain parts may be added for hiding the camera behind the central mirror. As shown in Figs. 2 and 3, these take the form of vertical cylindrical segments 15, which are located on the locus of the movable vertical edge of the central mirror and are movable along that locus. Springs 16 may be attached respectively to the feet 17 of these segments. The feet may be pivoted about the same point that the central mirror is pivoted. When the latter is in a position perpendicular to a line joining it with the sitter, the springs 16 hold the segments 15 back out of view. When the mirror is rotated, the forward-moving edge thereof may catch one edge of one of the segments and draw it forward against the action of the respective spring. As a result, it is impossible to see behind the mirror. The various parts may be chromium plated and give a modernistic configuration, which takes away any appearance of a machine. A suitable knob or other means may be provided for rotating the central mirror.

In Figs. 4 and 5 there is shown a plurality of pieces of furniture slightly modified from the type shown in Figs. 1-3. These are adapted to be used in connection with taking full-length pictures. There are on the market various vanities having full-length mirrors. These mirrors do not extend to the floor, nor is it necessary that they do for the purposes herein described. There are small drawers below the mirror slightly above the floor and there are also sets of drawers on each side of the mirror. This invention contemplates using at least two articles of furniture of this type. The specific design will depend upon the other objects in the room which are to be used; for example, one of the mirrors may be over a mantle or low fire place and one of the mirrors may be incorporated in a tall hatrack. The entire room may thus give the appearance of an entrance hall and may lack entirely those features usually associated with photographic studios. In Fig. 4 mirror 18 is shown over a low fireplace and mirror 19 forms a part of a full-length vanity. The mirrors are of the partially-transparent type described above and are set at an angle with each other such that a poser may stand in a central position 20 and, by looking into one mirror, see the profile shown in the other mirror. Cameras may be located behind the mirrors with which cameras the photographs of the profiles, as seen through the mirrors, are taken. Should it be desired to take a full face, it is only necessary that the poser look directly into one of the mirrors on a line perpendicular thereto and in order to do so, steps forward slightly to the position 21. The camera behind the mirror may then be turned toward the position 21.

If desired, the walls of the room may be set at such angles that the mirrors are parallel with the walls, but not with each other. At any event, the cameras may be operated from behind the mirrors and without any evidence thereof being visible to the person whose picture is being taken.

If it is found desirable, it may be necessary only to make one portion, for example, the upper portion of any one of the mirrors, partially transparent, and to place the camera behind that portion.

It is preferable in all cases that the camera be placed a certain distance behind the mirror so that the latter is not immediately in front of the camera lens.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device of the character described, the combination comprising an article of furniture having a semi-transparent mirror in a predetermined position, said article being of a type which normally has an opaque mirror in said position, and photographic means behind and adapted for photographing through said mirror, the said semi-transparent mirror being sufficiently opaque to conceal the photographic means from a subject being photographed, while being sufficiently transparent to enable the photographic means to photograph the subject through the said semi-transparent mirror.

2. In a device of the character described, the combination comprising an article of household furniture of a class usually having an opaque mirror associated therewith and provided with a mirror, said mirror being positioned in the place of the usual opaque mirror and being capable of transmitting therethrough a major portion of light incident thereon, and photographic means hidden behind said mirror and adapted for utilizing said transmitted light, the said mirror being sufficiently opaque to conceal the photographic means from a subject being photographed, while being sufficiently transparent to enable the photographic means to photograph the subject through the said mirror.

3. A dressing table having a mirror and a camera behind said mirror, said mirror being adapted for transmitting light therethrough and said camera being adapted for receiving said transmitted light, the said mirror being sufficiently opaque to conceal the camera from a subject being photographed, when the subject is in posing position in front of the said mirror, while being sufficiently transparent to enable the camera to photograph the subject through the said mirror.

4. A dressing table having a central mirror adapted for transmitting light therethrough, two side mirrors, one on each side of said central mirror, and camera means behind the central mirror adapted for taking a picture through said central mirror, said central mirror being rotatable and said side mirrors being positioned for reflecting light from said rotatable mirror to the subject to be photographed, the said central mirror being sufficiently opaque to conceal the camera means from a subject being photographed, when the subject is in posing position in front of the said mirror, while being sufficiently transparent to enable the camera means to photograph the subject through the said mirror.

5. In a device of the character described, the combination comprising two articles of furniture, each of a type usually having associated therewith a mirror and each provided with a mirror, each of said mirrors being adapted to transmit a major portion of the light incident thereon, said articles of furniture being spacedly positioned so that the mirror in each reflects light from the other back to a point from which said light arose, and photographic means behind at least one of said mirrors and hidden by the mirrors from a subject in posing position in front of the mirrors, the said mirrors being sufficiently transparent to permit the photographic means to photograph the subject through the mirrors.

6. In a device of the character described, the combination comprising two articles of furniture, each of a type usually having associated therewith a mirror and each provided with a mirror, each of said mirrors being adapted to transmit a major portion of the light incident thereon, other articles of furniture arranged in connection with said two articles of furniture so that all of said articles conform to an arrangement of furniture in a conventional room, said two articles of furniture being spacedly positioned so that the mirror in each reflects light from the other back to a point from which said light arose, and photographic means behind at least one of said mirrors and hidden by the mirrors from a subject in posing position in front of the mirrors, the said mirrors being sufficiently transparent to permit the photographic means to photograph the subject through said mirrors.

7. Photographic apparatus comprising, in combination, an article of furniture having a semi-transparent mirror in a predetermined position, the said article being of a type which normally has an opaque mirror in the said position and photographic means behind the mirror and adapted for photographing through the said mirror the said mirror and photographic means being positioned relatively to each other and to a poser before the mirror so that the photographic means is hidden from the poser by the mirror, the said mirror being sufficiently transparent to permit a picture to be taken therethrough and sufficiently opaque to conceal the camera from the poser.

8. Photographic apparatus comprising, in combination, an article of furniture having a semi-transparent mirror in a predetermined position, the said article being of a type which normally has an opaque mirror in the said position, and photographic means behind and adapted for photographing through the said mirror, the mirror being adapted to reflect sufficient light to enable an observer in normal photographic light to see his image and being also adapted to transmit sufficient light reflected from the observer to enable the photographic means to operate, the appearance of the mirror being such as to cause the observer to observe his image rather than to focus on the photographic means.

9. Photographic apparatus comprising, in combination, an article of household furniture of a class usually having an opaque mirror associated therewith and provided with a mirror, the said mirror being positioned in the place of the usual opaque mirror and being sufficiently transparent to permit a photograph to be taken therethrough and sufficiently opaque to conceal a camera positioned behind the mirror from an observer posed before the mirror, and a camera positioned behind the mirror so as to be hidden from the observer while utilizing light transmitted through the mirror for photographing through the said mirror the observer posed before the mirror.

10. In a device of the character described, the combination comprising an article of household furniture of a class usually having an opaque mirror associated therewith and provided with a mirror, the said mirror being positioned in the place of the usual opaque mirror and being rotatable and being capable of transmitting therethrough a major portion of light incident thereon, the said mirror being sufficiently opaque to conceal photographic means therebehind from a poser in photographing position, photographic means hidden behind the said mirror from a poser in photographing position in front of the said mirror, the said photographic means being adapted for utilizing the said transmitted light, and a side mirror positioned for reflecting light from the said rotatable mirror to the subject to be photographed.

11. An article of furniture for photographic studios comprising a conventional article of household furniture normally provided with an opaque mirror, a semitransparent mirror occupying the position normally occupied by the opaque mirror, the said semitransparent mirror being adapted to transmit sufficient light therethrough to enable a photograph to be taken through the mirror, while reflecting sufficient light to present a clear and uninterrupted or undistorted image of a poser before the mirror to the said poser, the said semitransparent mirror rendering invisible to the poser a camera positioned behind the mirror for photographing the poser therethrough.

OTHO V. KEAN.